(12) United States Patent
Kisselstein et al.

(10) Patent No.: US 11,656,421 B2
(45) Date of Patent: May 23, 2023

(54) TELECOMMUNICATIONS BOXES WITH MOVABLE ADAPTER HOLDER

(71) Applicant: PPC BROADBAND, INC., East Syracuse, NY (US)

(72) Inventors: Jay Kisselstein, Mexico, NY (US); Cameron James Adams, Camillus, NY (US); Peter Carapella, Fayetteville, NY (US); Brian P. Honsinger, Warners, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/934,000

(22) Filed: Jul. 20, 2020

(65) Prior Publication Data

US 2021/0018708 A1   Jan. 21, 2021

Related U.S. Application Data

(60) Provisional application No. 62/876,597, filed on Jul. 19, 2019.

(51) Int. Cl.
*G02B 6/00* (2006.01)
*G02B 6/44* (2006.01)

(52) U.S. Cl.
CPC ................ *G02B 6/4446* (2013.01)

(58) Field of Classification Search
CPC .... G02B 6/4446; G02B 6/3897; G02B 6/445; G02B 6/00
See application file for complete search history.

(56) References Cited

U.S. PATENT DOCUMENTS

| | | | |
|---|---|---|---|
| 2009/0190896 A1* | 7/2009 | Smith | G02B 6/4452 385/135 |
| 2009/0208178 A1 | 8/2009 | Kowalczyk et al. | |
| 2011/0013875 A1 | 1/2011 | Bran de León et al. | |
| 2016/0077296 A1* | 3/2016 | Kowalczyk | G02B 6/4446 385/135 |
| 2018/0120527 A1 | 5/2018 | Carapella et al. | |
| 2019/0196130 A1* | 6/2019 | Burkett | G02B 6/4452 |

FOREIGN PATENT DOCUMENTS

WO   2018048803 A1   3/2018

OTHER PUBLICATIONS

Search Report dated Oct. 21, 2020 in corresponding PCT Application No. PCT/US20/42837, 3 pages.
Written Opinion dated Oct. 21, 2020 in corresponding PCT Application No. PCT/US20/42837, 9 pages.

* cited by examiner

*Primary Examiner* — Jennifer Doan
(74) *Attorney, Agent, or Firm* — MH2 Technology Law Group LLP

(57) ABSTRACT

A telecommunications box includes a first housing portion, a second housing portion pivotally coupled with the first housing portion, an adapter panel removably coupled with the first housing portion, and an inner cover pivotally coupled with the first housing portion and removably coupled with the adapter panel. The adapter panel is configured to be uncoupled from the first housing so as to be pivotal with the inner cover relative to the first housing portion to a raised configuration that provides a technician with improved access to the adapter panel, and the adapter panel is configured to be uncoupled from the inner cover while remaining coupled with the first housing portion in a stowed configuration.

34 Claims, 9 Drawing Sheets

TELECOMMUNICATIONS BOXES WITH MOVABLE ADAPTER HOLDER

CROSS-REFERENCE TO RELATED APPLICATION

This application claims the benefit of U.S. Provisional Application No. 62/876,597, filed on Jul. 19, 2019. The disclosure of the prior application is hereby incorporated by reference herein in its entirety.

TECHNICAL FIELD

The disclosure relates generally to telecommunications boxes and, in particular, to telecommunications boxes having a movable adapter holder configured to provide a technician with improved access to adapters, for example, fiber optic adapters, for installing, uninstalling, reconfiguring, cleaning, servicing, etc. fiber optic connectors and fiber optic cables terminated by such connectors.

BACKGROUND

As demand for telecommunications increases, fiber optic networks are being extended in more and more areas. Conventionally, fiber optic enclosures are used to provide a subscriber access point to the fiber optic network. Such a fiber optic enclosure is connected to the fiber optic network through a subscriber cable connected to a network hub.

In many situations, the design of fiber optic enclosures is limited to a maximum size that presents space constraints that limit the amount of room in the box with which a technician has to work. Such space constraints make situations difficult for the technician when installing connectors, cleaning adapter ports, or working with the fiber management.

It may be desirable to provide a telecommunications box, or fiber box, with a small footprint and volume that still provide ample working room for the technician. It may be desirable to provide a box having an adapter holder that can be selectively latched and unlatched from a back wall of the box such that the adapter holder can be moved away from the back wall to provide additional room for a technician to work.

SUMMARY

According to various aspects of the disclosure, a telecommunications box includes a first housing portion defining an interior of the box and a second housing portion pivotally coupled with the first housing portion. The second housing portion is configured to cover the first housing portion to prevent access to the interior of the box. The box includes an adapter panel removably coupled with the first housing portion, and the adapter panel being configured to receive at least one fiber optic adapter that coupled a fiber of a distribution cable to a fiber of an output cable. The box includes an inner cover pivotally coupled to the first housing portion and configured to be selectively coupled with the adapter panel. The inner cover and the adapter panel are configured to separate the interior of the box into a first interior portion and a second interior portion. The inner cover and the adapter panel are configured to permit access to the first interior portion of the box and to block access to the second interior portion of the box when the inner cover and the adapter panel are fixedly coupled to one another and the adapter panel is fixedly coupled to the first housing portion. The adapter panel is configured to be pivotal with the inner cover relative to the first housing portion to a raised configuration that provides a technician with improved access to a side of the adapter panel facing the first interior portion when the inner cover is coupled with the adapter panel and the adapter panel is uncoupled from the first housing. The inner cover is configured to be movable away from the adapter panel when the inner cover is uncoupled from the adapter panel and the adapter panel is coupled with the first housing portion in a stowed configuration In accordance with some aspects of the disclosure, a telecommunications box includes a first housing portion, a second housing portion, an adapter panel, and an inner cover. The second housing portion is configured to be pivotally coupled with the first housing portion, the adapter panel is configured to be selectively coupled with the first housing portion, and an inner cover is configured to be pivotally coupled to the first housing portion selectively coupled with the adapter panel. The inner cover and the adapter panel are configured to permit access to the adapter panel when the inner cover and the adapter panel are fixedly coupled to one another and the adapter panel is fixedly coupled to the first housing portion. The inner cover is configured to be movable away from the adapter panel when the inner cover is uncoupled from the adapter panel and the adapter panel is coupled with the first housing portion in a stowed configuration.

In some aspects of the aforementioned telecommunications box, the first housing portion defines an interior of the box.

In some aspects of the aforementioned telecommunications box, the second housing portion is configured to cover the first housing portion to prevent access to the interior of the box.

In some aspects of the aforementioned telecommunications box, the adapter panel is configured to receive at least one fiber optic adapter that couples a fiber of a distribution cable with a fiber of an output cable.

In some aspects of the aforementioned telecommunications box, the inner cover and adapter panel are configured to separate the interior of the box into a first interior portion and a second interior portion.

In some aspects of the aforementioned telecommunications box, the inner cover and the adapter panel are configured to permit access to the first interior portion of the box and to block access to the second interior portion of the box when the inner cover and the adapter panel are fixedly coupled to one another and the adapter panel is fixedly coupled to the first housing portion.

In some aspects of the aforementioned telecommunications box, the adapter panel is configured to be pivotal with the inner cover relative to the first housing portion to a raised configuration that provides a technician with improved access to a side of the adapter panel facing the first interior portion when the inner cover is coupled with the adapter panel and the adapter panel is uncoupled from the first housing.

In some aspects of the aforementioned telecommunications box, the second housing is configured to pivot about a first axis relative to the first housing portion, and the inner cover is configured to pivot about a second axis relative to the first housing portion.

In some aspects of the aforementioned telecommunications box, the first axis and the second axis are parallel with one another.

In some aspects of the aforementioned telecommunications box, the adapter holder includes a base portion and an adapter panel portion that are disposed perpendicular to one another.

In some aspects of the aforementioned telecommunications box, the base portion include a retention structure configured to cooperate with a retention structure of the first housing portion to selectively secure the adapter holder to the first housing portion.

In some aspects of the aforementioned telecommunications box, the base portion is configured to be removably coupled with a back wall of the first housing portion, and the adapter panel portion extends perpendicular to the back wall proximate a middle of the back wall.

In some aspects of the aforementioned telecommunications box, the adapter holder is configured such that the fiber of the distribution cable and the fiber of the output cable are permitted to remain connected with the adapter holder when the adapter holder is moved between the raised configuration and the stowed configuration.

In some aspects of the aforementioned telecommunications box, the side of the adapter panel facing the first interior portion and the output cables in the first interior portion are permitted to remain undisturbed when the inner cover is moved away from the adapter holder.

DETAILED DESCRIPTION OF EMBODIMENTS

Figure 1:
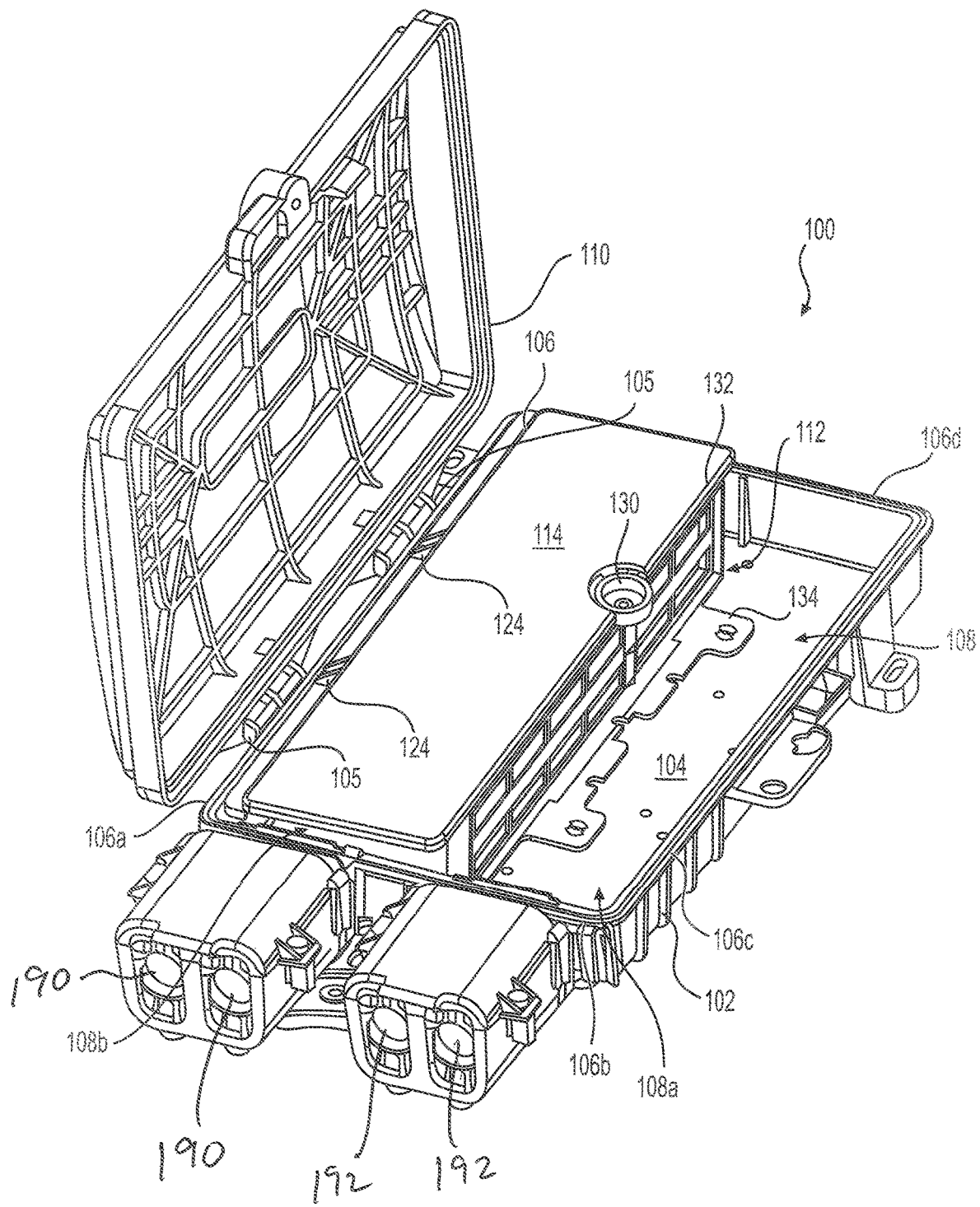
FIG. 1 is a perspective view of an exemplary telecommunications box according to various aspects of the disclosure.

FIGS. 1-6 illustrate an exemplary telecommunications box 100, for example, a fiber box that is part of a fiber optic telecommunications system. The box 100 includes a first housing portion 102 having a back wall 104 and four side walls 106a-106d. The back wall 104 and the four side walls 106a-d define an interior 108, which can be closed by a second housing portion 110. The first and second housing portions 102, 110 can be closed to form a perimeter seal about one plane, thereby permitting a box having a shallow lid to provide a simple and reliable seal.

The second housing portion 110 can be pivotally coupled with the first housing portion 102, for example, via at least one hinge 105 such that the second housing portion 110 is configured to pivot relative to the first housing portion 102 between a first closed position (not shown) and a second open position as shown in FIGS. 1-6. In one embodiment, the at least one hinge 105 may be disposed at a first wall 106a of the four side walls of the first housing portion 102 and a corresponding wall of the second housing portion 104. Of course, any conventional means for coupling the second housing portion 110 with the first housing portion 102 such that the second housing portion 110 is movable between closed and open positions is contemplated by this disclosure.

As would be understood by persons having ordinary skill in the art, in the first closed position, the second housing portion 110 blocks access to the contents of the box 100. In the second open position, as shown in FIGS. 1-4, the second housing portion 110 is configured to allow access to an adapter holder 112 and an inner cover 114. The inner cover 114 may be pivotally mounted to the first housing portion 102 at the first wall 106a such that a pivot axis of the inner cover 114 is parallel to a pivot axis between the first and second housing portions 102, 110. It should be appreciated that, in some aspects, the inner cover 114 may be pivotally mounted at any other one 106b-106d of the four side walls of the first housing portion 102. However, for the reasons discussed more fully below, it may be preferable to pivotally mount the inner cover 114 at the first wall 106a.

Figure 5:
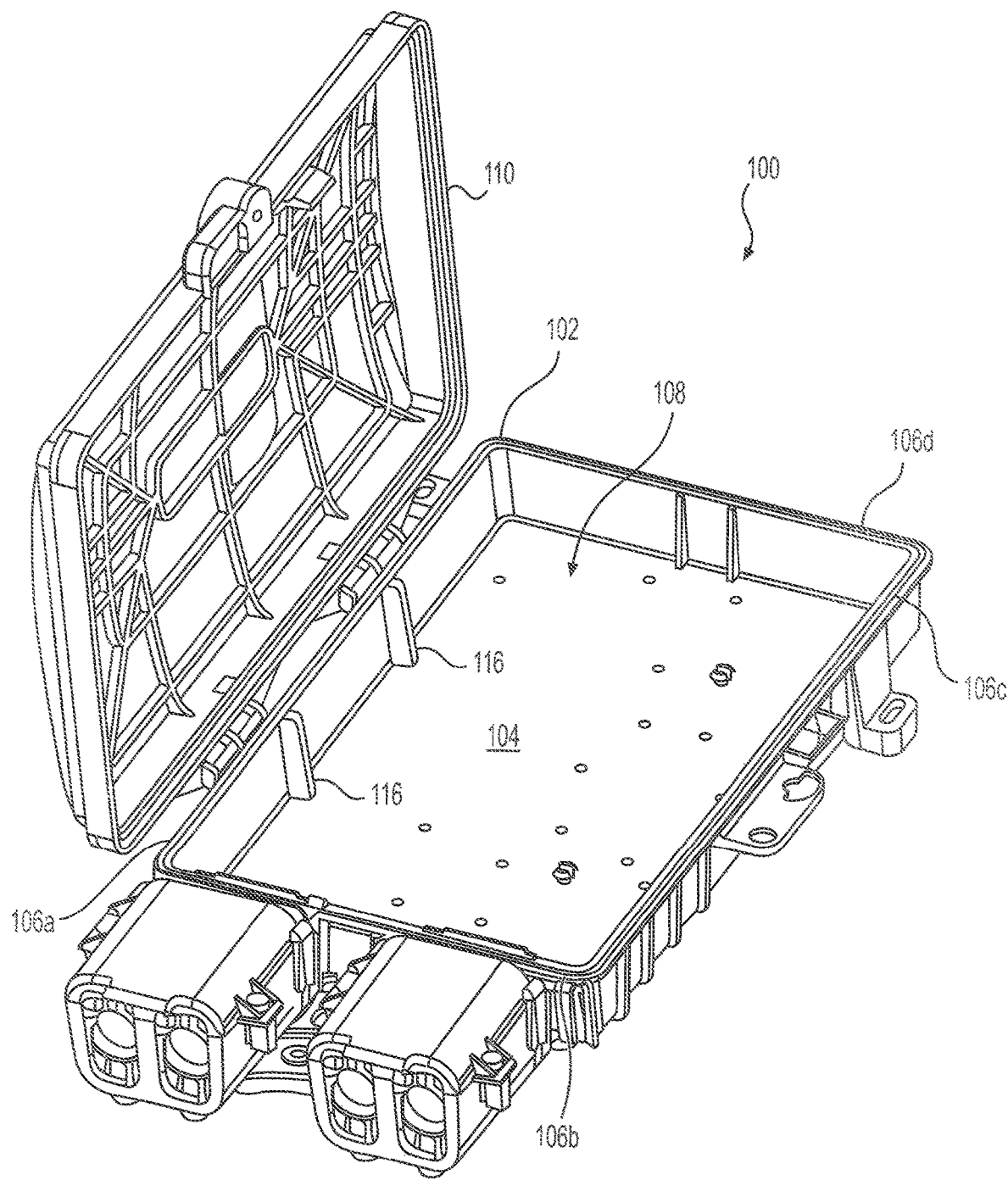
FIG. 5 is a perspective view of the telecommunications box of FIG. 1 with the adapter holder and inner cover removed.
Figure 6:
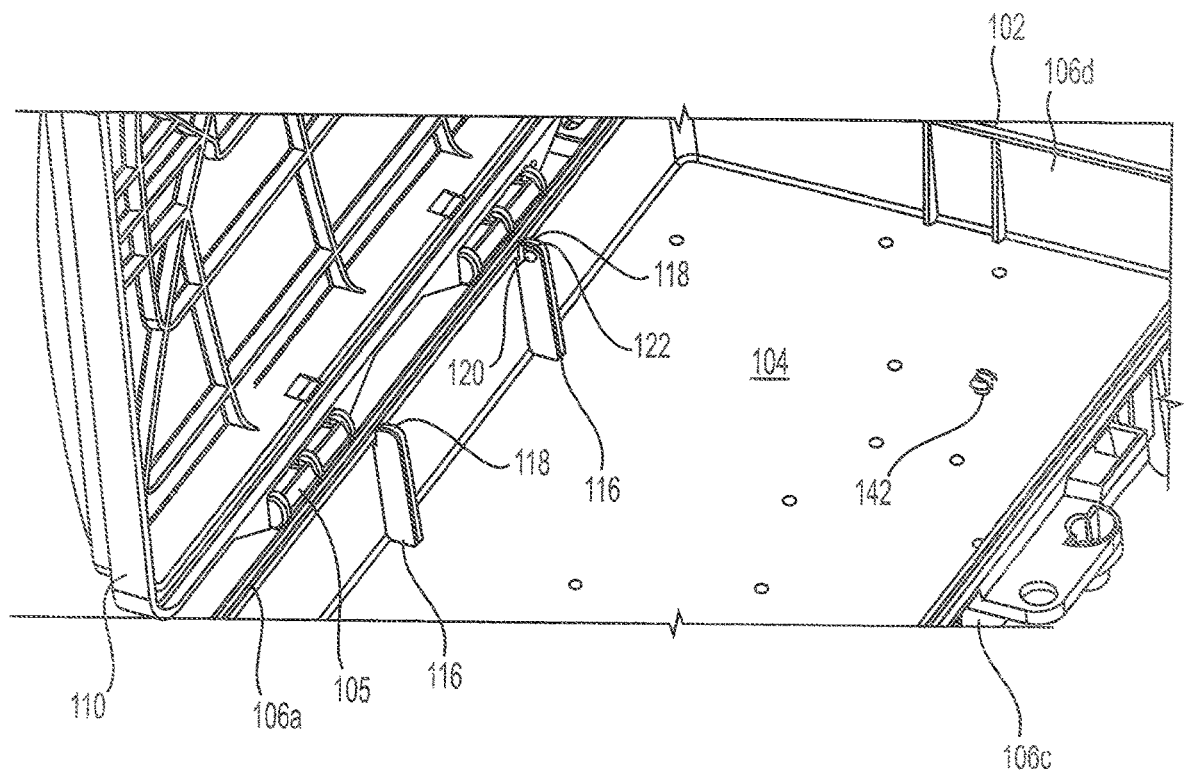
FIG. 6 is an enlarged perspective view of the telecommunications box of FIG. 1 with the adapter holder and inner cover removed.

Referring to FIGS. 5 and 6, the box 100 includes two columns 116 adjacent the first wall 106a. The columns 116 extend upward from the base 104 of the first housing portion 102. Each of the columns 116 includes a receiving hole 120 near an end 118 away from the base 104 and a guiding notch 122 from the receiving hole 120 to the end 118. In the event that the holes 120 are not through holes, the holes 120 face one another. In some aspects, the holes 120 may be through holes.

Figure 2:
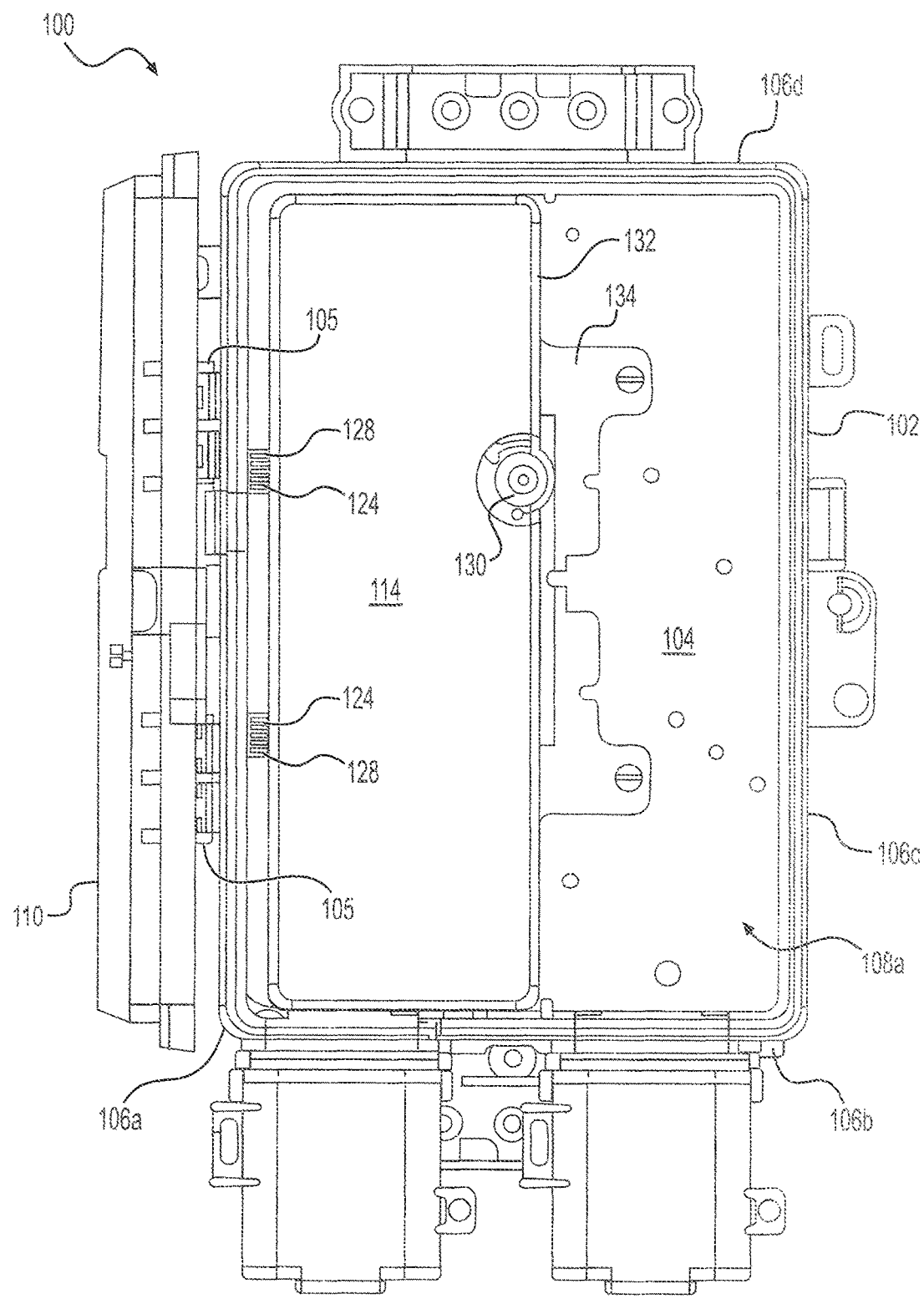
FIG. 2 is a top view of the telecommunications box of FIG. 1

As best illustrated in FIGS. 1 and 2, the inner cover 114 includes hinge arms 124 that extend from a first edge 126 of the inner cover 114. Each of the hinge arms 124 includes a hinge pin 128 that is sized and arranged to be received by a respective one of the receiving holes 120. The hinge arms 124 are spaced apart from one another and the hinge pins 128 extend from their respective hinge arms 124 in directions opposite to one another such that the hinge pins 128 can both be seated in their respective receiving holes 120 to provide the pivotal relationship between the inner cover 114 and the first housing portion 102. The guiding notches 122 may help to guide the hinge pins 128 into the receiving holes 120 when coupling the inner cover 114 with the first housing portion 102.

The inner cover 114 includes a fastener hole 130 at a second edge 132 that is opposite to the first edge 126. The fastener hole 130 is configured to receive a fastener (not shown) such as, for example, a security screw. It should be understood that other conventional fasteners are contemplated by the disclosure.

Figure 3:
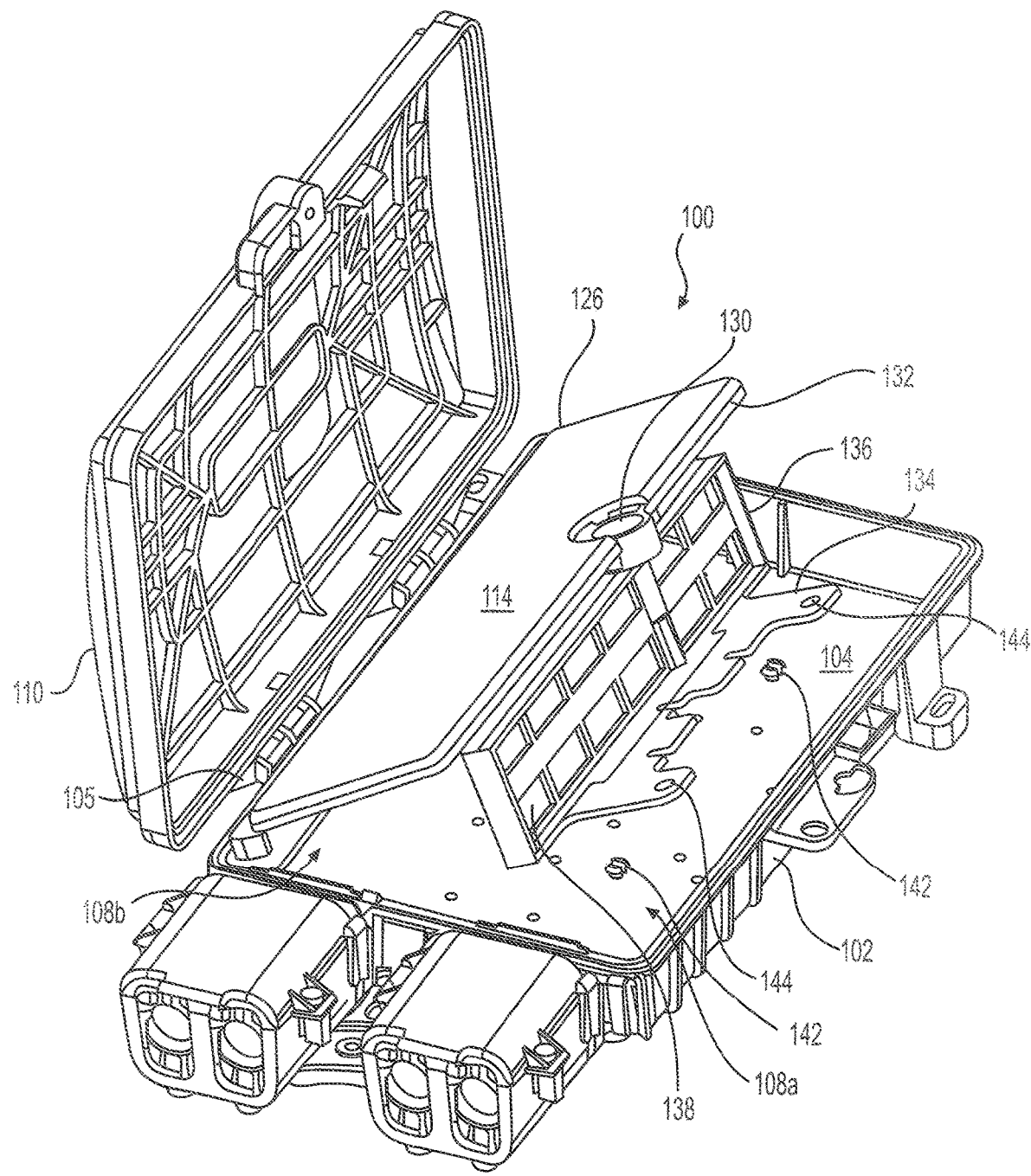
FIG. 3 is a perspective view of the telecommunications box of FIG. 1 with an adapter holder in a raised configuration.

The adapter holder 112 is configured to house a plurality of adapters (not shown) that are configured to optically couple fiber output cables to connectorized ends of one or more distribution cables (not shown in FIGS. 1-4). The adapter holder 112 includes a base portion 134 and an adapter panel portion 136 that are disposed perpendicular to one another. As best shown in FIG. 3, the adapter panel portion 136 defines a plurality of openings 138. Each opening 138 is sized to securely receive the aforementioned adapters. The adapter panel portion 136 includes a receiving hole 140 configured to be aligned with the fastener hole 130 and to receive the fastener such that the adapter holder 112 and the inner cover 114 can be coupled together in a coupled configuration.

Figure 4:
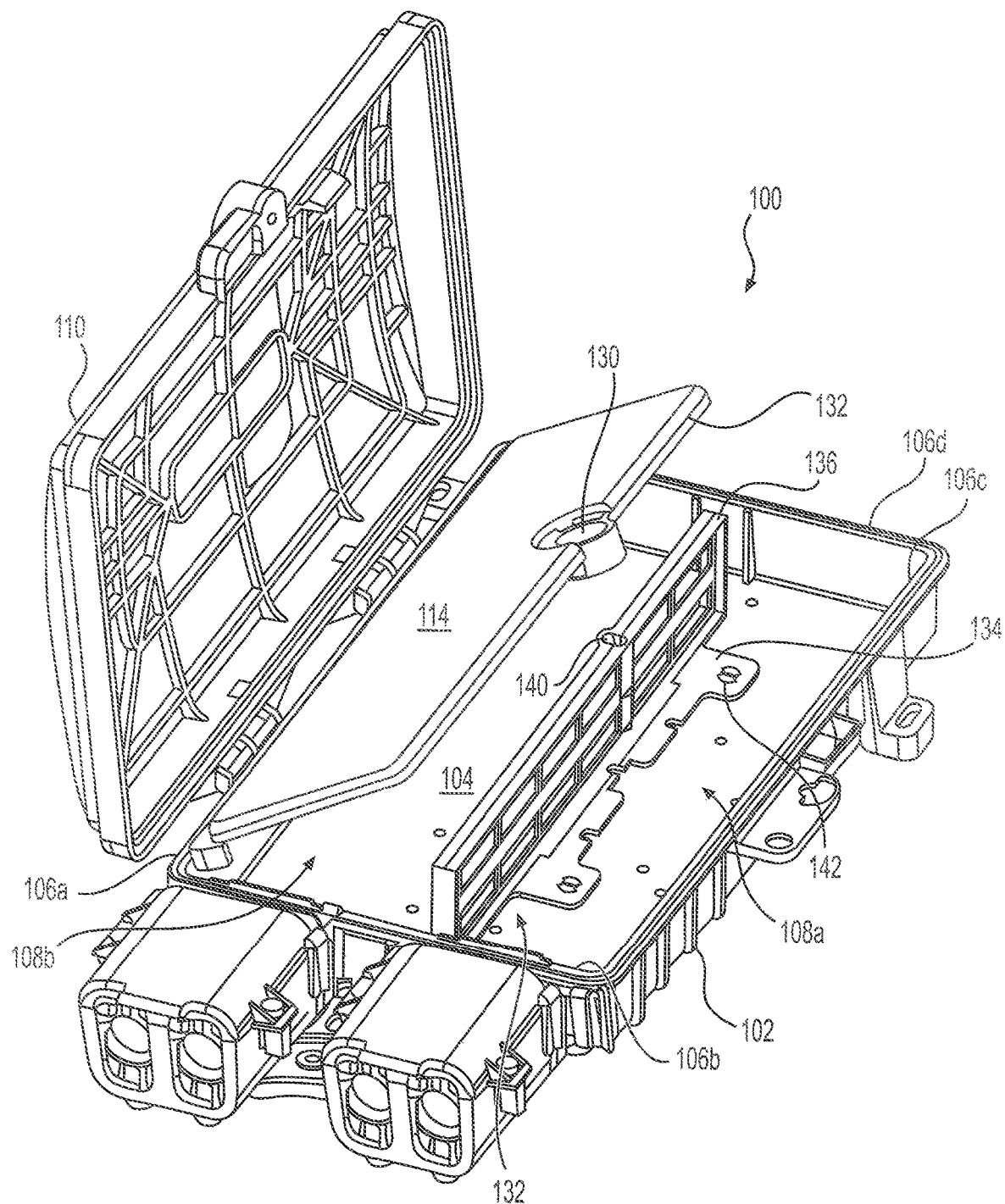
FIG. 4 is a perspective view of the telecommunications box of FIG. 1 with the adapter holder in a stowed configuration.

As best shown in FIGS. 1 and 4, in a stowed configuration, the base portion 134 is configured to be removably coupled with the back wall 104 of the first housing portion 102, and the adapter panel portion 136 extends perpendicular to the back wall 104 near the middle of the back wall 104. As illustrated, the base portion 134 may include through holes 144 that are aligned with and configured to receive retention structures 142 protruding from the back wall 104. In some aspects, the retention structures 142 may be snap fit fingers that are received in the through holes 144 and provide a snap fit coupling between the base portion 134 and the back wall 104.

When the inner cover 114 and the adapter holder 112 are in the coupled configuration and the adapter holder 112 is in the stowed configuration, a technician has access to connectors and adapters disposed at a field side 108a of the interior 108 (right side of the box 100 in FIG. 2), but the technician does not have access to a plant side 108b of the interior (left side of the box in FIG. 2) that is closed by the inner cover 114. It should be understood that the distribution cables may enter the plant side 108b of the interior 108 of the box 100 via one or more first ports 190, while the output cables may exit the field side 108a of the interior 108 of the box 100 via one or more second ports 192.

Although the technician can access the field side 108a of the interior 108 when the base portion 134 of the adapter panel portion 136 is coupled with the back wall 104, it may be difficult to grasp and/or manipulate the various connectors, adapters, and fiber cables on the field side 108a due to the limited space between the adapter panel portion 136 and the wall 106c opposite to the first wall 106a. In order to provide easier access to the connectors, adapters, and fiber cables on the field side 108a, the base portion 134 can be uncoupled from the back wall 104 to a raised configuration. For example, the retention structures 142 are configured to be removed from the through holes 144 to release the adapter holder 112 and permit the adapter holder 112 and the inner cover 114 to pivot together relative to the first housing portion 102 to the raised configuration shown in FIG. 3. In the embodiment shown, the snap fit fingers can be squeezed together by the technician so that the base portion 134 can be uncoupled from the back wall 104. In the raised configuration, the adapter panel portion 136 is positioned at a better angle, enabling the technician to more easily access fiber optical components on the field side 108a for optical inspection, optical cleaning, maintenance, and fiber cable management.

As long as the inner cover 114 and the adapter holder 112 remain coupled together as the adapter holder 112 is moved to the raised configuration, technician access to the plant side 108b remains limited. However, in some instances, a technician may need to access the plant side 108b of the interior but may not want to disturb the connector, adapters, and/or fiber cables on the field side 108a. In such instances, the technician can keep the adapter holder 112 coupled to the back wall 104 in the stowed configuration and, assuming that the technician has a security key to unlock the security fastener, the inner cover 114 can be uncoupled from the adapter holder 112 such that the inner cover 114 can be pivoted relative to the first housing portion 102 while the adapter holder 112 remains stationary and coupled to the back wall 104.

The foregoing embodiment of the box 100 thus provides a method to gain improved access to the adapters, connectors, and/or fiber cables on the field side 108a of the box 100 by coupling the adapter holder 112 with the inner cover 114 such that the adapter holder 112 can be moved away from the back wall 104 by pivoting with the inner cover 114. Even while the adapter holder 112 pivots with the inner cover 114, the plant side 108b of the adapters remains separated and largely inaccessible.

Figure 7:
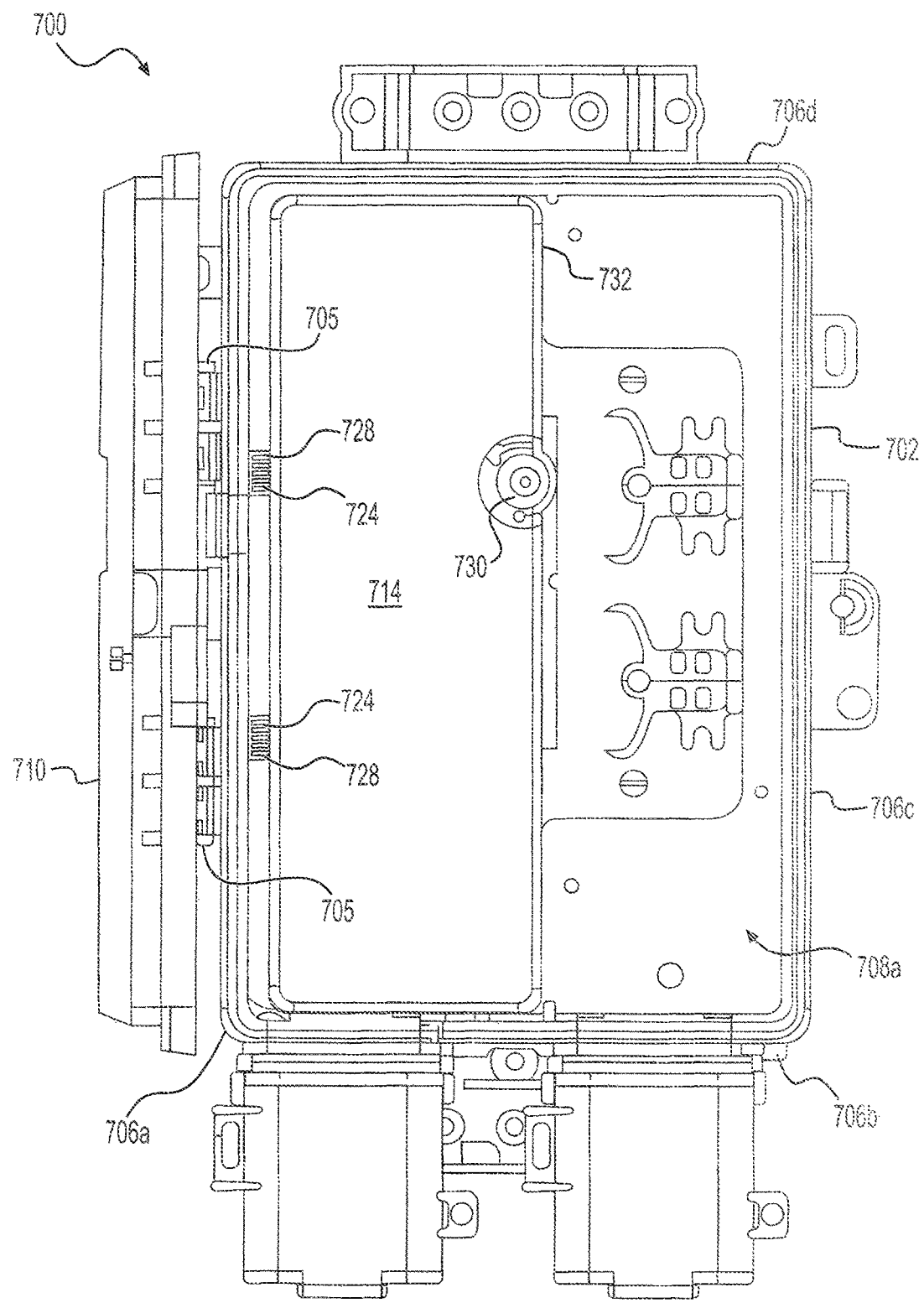
FIG. 7 is a top view of another exemplary telecommunications box according to various aspects of the disclosure.
Figure 8:
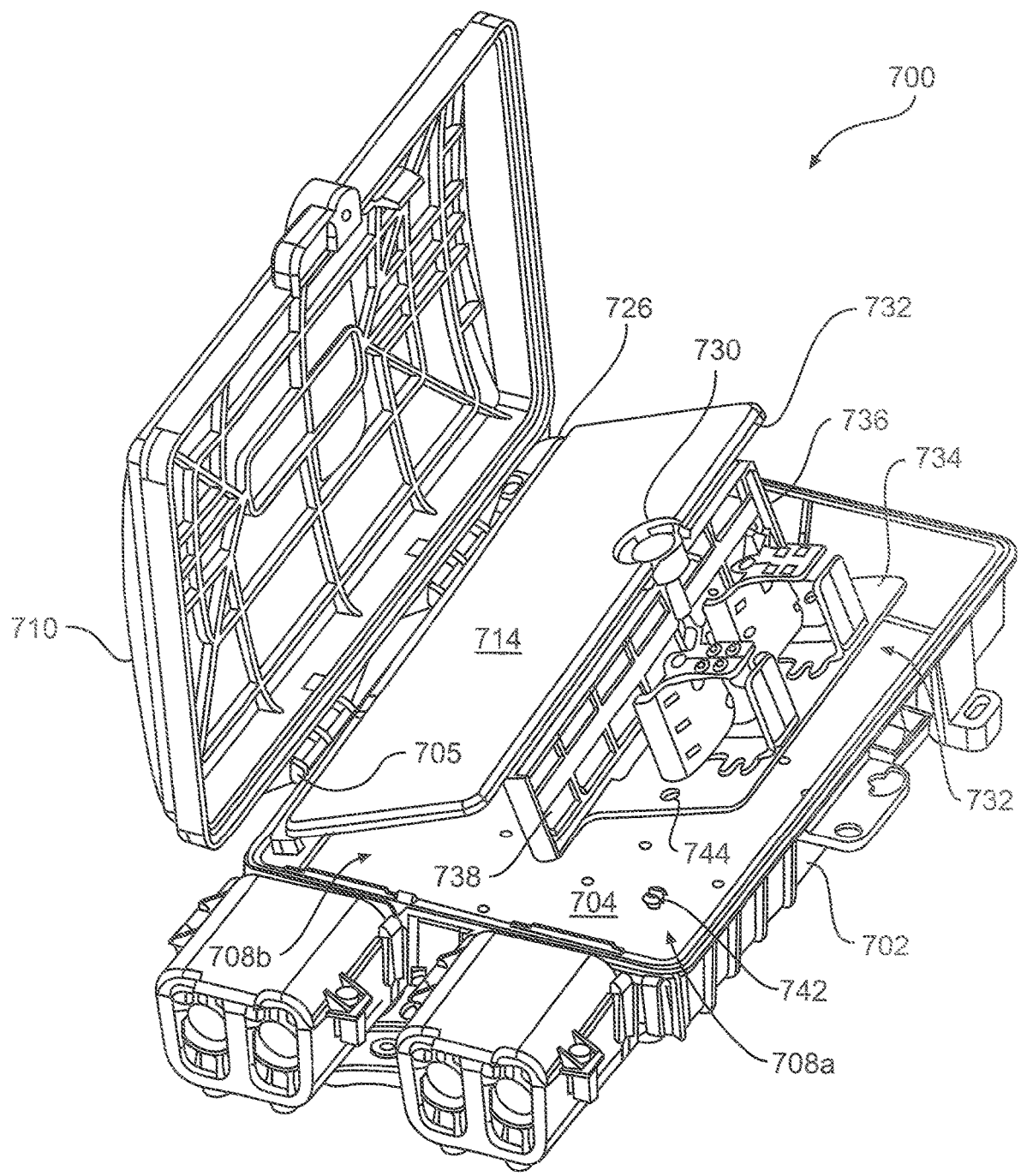
FIG. 8 is a perspective view of the telecommunications box of FIG. 7 with the adapter holder in a raised configuration.
Figure 9:
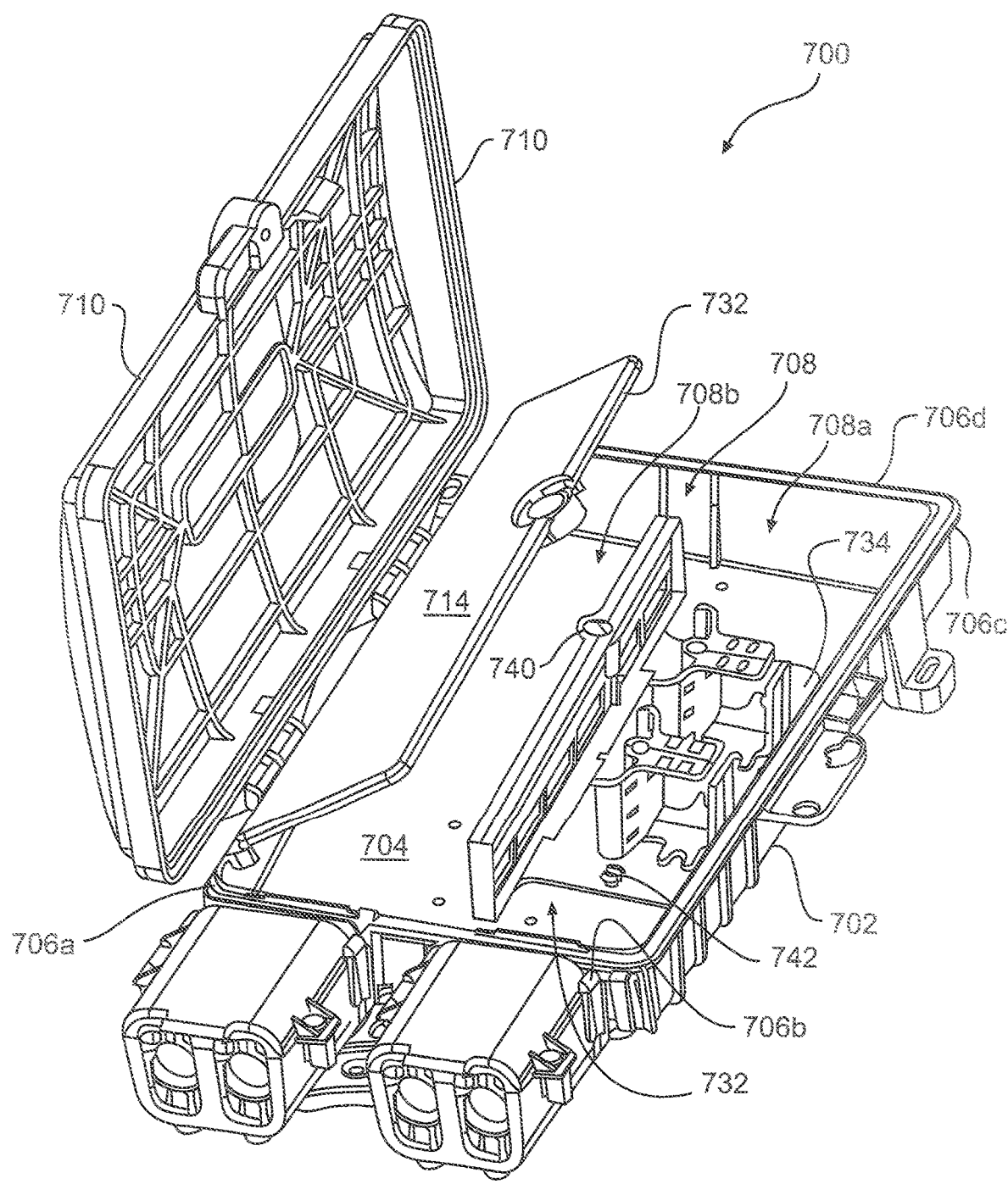
FIG. 9 is a perspective view of the telecommunications box of FIG. 7 with the adapter holder in a stowed configuration.

FIGS. 7-9 illustrate another exemplary telecommunications box 700, for example, a fiber box that is part of a fiber optic telecommunications system. The box 700 includes a first housing portion 702 having a back wall 704 and four side walls 706a-706d. The back wall 704 and the four side walls 706a-d define an interior 708, which can be closed by a second housing portion 710. The first and second housing portions 702, 710 can be closed to form a perimeter seal about one plane, thereby permitting a box having a shallow lid to provide a simple and reliable seal.

The second housing portion 710 can be pivotally coupled with the first housing portion 702, for example, via at least one hinge 705 such that the second housing portion 710 is configured to pivot relative to the first housing portion 702 between a first closed position (not shown) and a second open position as shown in FIGS. 7-9. In one embodiment, the at least one hinge 705 may be disposed at a first wall 706a of the four side walls of the first housing portion 702 and a corresponding wall of the second housing portion 704. Of course, any conventional means for coupling the second housing portion 710 with the first housing portion 702 such that the second housing portion 710 is movable between closed and open positions is contemplated by this disclosure.

As would be understood by persons having ordinary skill in the art, in the first closed position, the second housing portion 710 blocks access to the contents of the box 700. In the second open position, as shown in FIGS. 7-9, the second housing portion 710 is configured to allow access to an adapter holder 712 and an inner cover 714. The inner cover 714 may be pivotally mounted to the first housing portion 702 at the first wall 706a such that a pivot axis of the inner cover 714 is parallel to a pivot axis between the first and second housing portions 702, 710. It should be appreciated that, in some aspects, the inner cover 714 may be pivotally mounted at any other one 706b-706d of the four side walls of the first housing portion 702. However, for the reasons discussed more fully below, it may be preferable to pivotally mount the inner cover 714 at the first wall 706a.

The box 700 includes two columns (not shown) similar to the two columns 116 shown in FIGS. 5 and 6 and described above. As best illustrated in FIG. 7, the inner cover 714 includes hinge arms 724 that extend from a first edge 726 of the inner cover 714. Each of the hinge arms 724 includes a hinge pin 728 that are sized and arranged to be received by a respective one of the receiving holes 120 of the columns 116. The hinge arms 724 are spaced apart from one another and the hinge pins 728 extend from their respective hinge arms 724 in directions opposite to one another such that the hinge pins 728 can both be seated in their respective receiving holes 120 to provide the pivotal relationship between the inner cover 714 and the first housing portion 702. The guiding notches 122 may help to guide the hinge pins 728 into the receiving holes 120 when coupling the inner cover 714 with the first housing portion 702.

The inner cover 714 includes a fastener hole 730 at a second edge 732 that is opposite to the first edge 726. The fastener hole 730 is configured to receive a fastener (not shown) such as, for example, a security screw. It should be understood that other conventional fasteners are contemplated by the disclosure.

The adapter holder 712 is configured to house a plurality of adapters (not shown) that are configured to optically couple fiber output cables to connectorized ends of one or more distribution cables (not shown in FIGS. 7-9). The adapter holder 712 includes a base portion 734 and an adapter panel portion 736 that are disposed perpendicular to one another. As best shown in FIG. 3, the adapter panel portion 736 defines a plurality of openings 738. Each opening 738 is sized to securely receive the aforementioned adapters. The adapter panel portion 736 includes a receiving hole 740 configured to be aligned with the fastener hole 730 and to receive the fastener such that the adapter holder 712 and the inner cover 714 can be coupled together in a coupled configuration.

As best shown in FIG. 9, in a stowed configuration, the base portion 734 is configured to be removably coupled with the back wall 704 of the first housing portion 702, and the adapter panel portion 736 extends perpendicular to the back wall 704 near the middle of the back wall 704. As illustrated, the base portion 734 may include through holes 744 that are aligned with and configured to receive retention structures 742 protruding from the back wall 704. In some aspects, the retention structures 742 may be snap fit fingers that are received in the through holes 744 and provide a snap fit coupling between the base portion 734 and the back wall 704.

The box 700 includes one or more fiber management structures 750 coupled with the base portion 734 of the adapter holder 712. Thus, the fiber management structures 750 are configured to pivot with the adapter holder 712. The fiber management structures 750 may be separate structures that are coupled with the base portion 734 (fixedly or removably) or the fiber management structures 750 may be integrally formed with the base portion 734 as a single piece of unitary construction. Each fiber management structure 750 may include a curved guide panel 752 that extends perpendicular to the base portion 734 and is configured to maintain fiber cables at a minimum bend radius to prevent kinking and, thus, potential signal loss. Each of the fiber management structures 750 may include a first planar guide panel 754 that extends perpendicular to the base portion 734 and are spaced from the curved guide panel 752 such that fiber cables can be positioned between the curved guide panel 752 and the first planar guide panel 754. Each of the fiber management structures 750 may include a second guide panel 756 that extends from an end of the curved guide panel 752 toward the first guide panel 754 but are spaced from the first guide panel 754 to allow fiber cables to be moved into an interior space 758 defined by the curved guide panel 754, the first guide panel 756, and the second guide panel 758. In some embodiments, a fiber optic cables can be coupled with the curved guide panel 754, the first guide panel 756, and the second guide panel 758, for example, with tie wraps, Velcro, or the like.

When the inner cover 714 and the adapter holder 712 are in the coupled configuration and the adapter holder 712 is in the stowed configuration (not shown), a technician has access to connectors and adapters disposed at a field side 708a of the interior 708 (right side of the box 700 in FIG. 7), but the technician does not have access to a plant side 708b of the interior (left side of the box 700 in FIG. 7) that is closed by the inner cover 714.

Although the technician can access the field side 708a of the interior 708 when the base portion 734 of the adapter panel portion 736 is coupled with the back wall 704, it may be difficult to grasp and/or manipulate the various connectors, adapters, and fiber cables on the field side 708a due to the limited space between the adapter panel portion 736 and the wall 706c opposite to the first wall 706a. In order to provide easier access to the connectors, adapters, and fiber cables on the field side 708a, the base portion 734 can be uncoupled from the back wall 704 to a raised configuration. For example, the retention structures 742 are configured to be removed from the through holes 744 to release the adapter holder 712 and permit the adapter holder 712 and the inner cover 714 to pivot together relative to the first housing portion 702 to the raised configuration shown in FIG. 3. In the embodiment shown, the snap fit fingers can be squeezed together by the technician so that the base portion 734 can be uncoupled from the back wall 704. In the raised configuration, the adapter panel portion 736 is positioned at a better angle, enabling the technician to more easily access fiber optical components for optical inspection, optical cleaning, maintenance, and fiber cable management.

As long as the inner cover 714 and the adapter holder 712 remain coupled together as the adapter holder 712 is moved to the raised configuration, technician access to the plant side 708b remains limited. However, in some instances, a technician may need to access the plant side 708b of the interior but may not want to disturb the connector, adapters, and/or fiber cables on the field side 708a. In such instances, the technician can keep the adapter holder 712 coupled to the back wall 704 in the stowed configuration and, assuming that the technician has a security key to unlock the security fastener, the inner cover 714 can be uncoupled from the adapter holder 712 such that the inner cover 714 can be pivoted relative to the first housing portion 702 while the adapter holder 712 remains stationary.

The foregoing embodiment of the box 700 thus provides a method to gain improved access to the adapters, connectors, and/or fiber cables on the field side 708a of the box 700 by coupling the adapter holder 712 with the inner cover 714 such that the adapter holder 712 can be moved away from the back wall 704 by pivoting with the inner cover 714. Even while the adapter holder 712 pivots with the inner cover 714, the plant side 708b of the adapters remain separated and largely inaccessible.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A telecommunications box for providing improved access to adapters housed in the box comprising:
   a first housing portion defining an interior of the box;
   a second housing portion configured to be pivotally coupled with the first housing portion;
   an adapter panel configured to be removably coupled with the first housing portion;
   an inner cover configured to be pivotally coupled to the first housing portion and configured to be selectively coupled with the adapter panel;
   wherein the second housing portion is configured to cover the first housing portion to prevent access to the interior of the box;
   wherein the adapter panel is configured to receive at least one fiber optic adapter that is configured to couple a fiber connector of a distribution cable with a fiber connector of an output cable;
   wherein the inner cover and adapter panel are configured to separate the interior of the box into a first interior portion and a second interior portion;
   wherein the inner cover and the adapter panel are configured to permit access to the first interior portion of the box and to block access to the second interior portion of the box when the inner cover and the adapter panel are fixedly coupled to one another and the adapter panel is fixedly coupled to the first housing portion;
   wherein the inner cover is configured to be selectively moved away from the adapter panel when the inner cover is uncoupled from the adapter panel and the adapter panel is coupled with the first housing portion in a stowed configuration; and
   wherein the adapter panel is configured to pivot with the inner cover relative to the first housing portion to a raised configuration so as to provide a technician with improved access to a side of the adapter panel facing the first interior portion when the inner cover is coupled with the adapter panel and the adapter panel is uncoupled from the first housing portion.

2. A telecommunications box for providing improved access to adapters housed in the box comprising:
   a first housing portion;
   a second housing portion configured to be pivotally coupled with the first housing portion;
   an adapter panel configured to be removably coupled with the first housing portion;
   an inner cover configured to be pivotally coupled to the first housing portion and configured to be selectively coupled with the adapter panel;
   wherein the inner cover and the adapter panel are configured to permit access to the adapter panel when the inner cover and the adapter panel are fixedly coupled to one another and the adapter panel is fixedly coupled to the first housing portion;
   wherein the inner cover is configured to be selectively moved away from the adapter panel when the inner cover is uncoupled from the adapter panel and the adapter panel is coupled with the first housing portion in a stowed configuration;
   wherein the inner cover and the adapter panel are configured to separate an interior of the box into a first interior portion and a second interior portion; and
   wherein the adapter panel is configured to pivot with the inner cover relative to the first housing portion to a raised configuration so as to provide a technician with improved access to a side of the adapter panel facing the first interior portion when the inner cover is coupled with the adapter panel and the adapter panel is uncoupled from the first housing portion.

3. The telecommunications box of claim 2, wherein the first housing portion is configured to define the interior of the box.

4. The telecommunications box of claim 2, wherein the second housing portion is configured to cover the first housing portion to prevent access to the interior of the box.

5. The telecommunications box of claim 2, wherein the adapter panel is configured to receive a fiber optic adapter that is configured to couple a fiber connector of a distribution cable with a fiber connector of an output cable.

6. The telecommunications box of claim 2, wherein the inner cover and the adapter panel are configured to permit access to the first interior portion of the box and to block access to the second interior portion of the box when the inner cover and the adapter panel are fixedly coupled to one another and the adapter panel is fixedly coupled to the first housing portion.

7. The telecommunications box of claim 2, wherein the second housing portion is configured to pivot about a first axis relative to the first housing portion, and the inner cover is configured to pivot about a second axis relative to the first housing portion.

8. The telecommunications box of claim 7, wherein the first axis and the second axis are parallel with one another.

9. The telecommunications box of claim 2, wherein the adapter panel includes a base portion and an adapter holder portion that are disposed perpendicular to one another.

10. The telecommunications box of claim 9, wherein the base portion includes a retention structure configured to cooperate with a retention structure of the first housing portion to selectively secure the adapter panel to the first housing portion.

11. The telecommunications box of claim 9, wherein the base portion is configured to be removably coupled with a back wall of the first housing portion, and the adapter holder portion extends perpendicular to the back wall proximate a middle of the back wall.

12. The telecommunications box of claim 5, wherein the adapter panel is configured such that the fiber connector of the distribution cable and the fiber connector of the output cable are permitted to remain connected with the adapter holder when the adapter holder is moved between the raised configuration and the stowed configuration.

13. The telecommunications box of claim 2, wherein a side of the adapter panel facing the first interior portion and the output cable in the first interior portion are permitted to remain undisturbed when the inner cover is moved away from the adapter holder.

14. A telecommunications box for providing improved access to adapters housed in the box comprising:
   a first housing portion;
   a second housing portion configured to be pivotally coupled with the first housing portion;
   an adapter holder portion configured to be removably coupled with the first housing portion;
   an inner cover portion configured to be pivotally coupled to the first housing portion and configured to be selectively coupled with the adapter holder portion;
   wherein the inner cover portion and the adapter holder portion are configured to permit access to the adapter holder portion when the inner cover portion and the adapter holder portion are fixedly coupled to one another and the adapter holder portion is fixedly coupled to the first housing portion;

wherein the inner cover portion is configured to be selectively moved away from the adapter holder portion when the inner cover portion is uncoupled from the adapter holder portion and the adapter holder portion is coupled with the first housing portion in a stowed configuration;

wherein the adapter holder portion is configured to receive a fiber optic adapter that is configured to couple a fiber connector of a first fiber cable with a fiber connector of a second fiber cable; and wherein the adapter holder portion is configured to permit the fiber connector of the first fiber cable and the fiber connector of the second fiber cable to remain connected with the adapter holder portion when the adapter holder portion is moved between the raised configuration and the stowed configuration.

15. The telecommunications box of claim 14, wherein the first housing portion is configured to define an interior of the box.

16. The telecommunications box of claim 14, wherein the second housing portion is configured to cover the first housing portion to prevent access to an interior of the box.

17. The telecommunications box of claim 14, wherein the inner cover portion and adapter holder portion are configured to separate an interior of the box into a first interior portion and a second interior portion.

18. The telecommunications box of claim 17, wherein the inner cover portion and the adapter holder portion are configured to permit access to the first interior portion of the box and to block access to the second interior portion of the box when the inner cover portion and the adapter holder portion are fixedly coupled to one another and the adapter holder portion is fixedly coupled to the first housing portion.

19. The telecommunications box of claim 14, wherein the second housing portion is configured to pivot about a first axis relative to the first housing portion, and the inner cover portion is configured to pivot about a second axis relative to the first housing portion.

20. The telecommunications box of claim 19, wherein the first axis and the second axis are parallel with one another.

21. The telecommunications box of claim 14, wherein the adapter holder portion includes a base portion and an adapter receiving portion that are disposed perpendicular to one another.

22. The telecommunications box of claim 21, wherein the base portion includes a retention structure configured to cooperate with a retention structure of the first housing portion to selectively secure the adapter holder portion to the first housing portion.

23. The telecommunications box of claim 21, wherein the base portion is configured to be removably coupled with a back wall of the first housing portion, and the adapter receiving portion extends perpendicular to the back wall.

24. The telecommunications box of claim 17, wherein a side of the adapter holder portion facing the first interior portion and the second fiber cable in the first interior portion are permitted to remain undisturbed when the inner cover portion is moved away from the adapter holder portion.

25. A telecommunications box for providing improved access to adapters housed in the box comprising:

a box portion;

a receiving structure configured to be removably coupled with the box portion;

an access control portion configured to be pivotally coupled with the box portion and configured to be selectively coupled with the receiving structure;

wherein the access control portion is configured to be pivoted away from the receiving structure when the access control portion is uncoupled from the receiving structure and the receiving structure is coupled with the box portion in a first configuration;

wherein the receiving structure is configured to receive a fiber optic adapter that is configured to couple a fiber connector of a first cable with a fiber connector of a second cable; and wherein the receiving structure is configured to pivot with the access control portion relative to the box portion to a raised configuration so as to provide a technician with improved access to a side of the adapter panel when the access control portion is coupled with the receiving structure and the receiving structure is uncoupled from the box portion.

26. The telecommunications box of claim 25, wherein the box portion defines an interior of the telecommunications box.

27. The telecommunications box of claim 25, further comprising a second box portion configured to cover the box portion to prevent access to an interior of the telecommunications box.

28. The telecommunications box of claim 25, wherein the access control portion and the receiving structure are configured to separate an interior of the telecommunications box into a first interior portion and a second interior portion.

29. The telecommunications box of claim 28, wherein the access control portion and the receiving structure are configured to permit access to the first interior portion of the box and to block access to the second interior portion of the box when the access control portion and the receiving structure are fixedly coupled to one another and the receiving structure is fixedly coupled to the box portion.

30. The telecommunications box of claim 27, wherein the second box portion is configured to pivot about a first axis relative to the box portion, and the access control portion is configured to pivot about a second axis relative to the box portion.

31. The telecommunications box of claim 30, wherein the first axis and the second axis are parallel with one another.

32. The telecommunications box of claim 25, wherein the receiving structure includes a base portion and an adapter holder portion that are disposed perpendicular to one another.

33. The telecommunications box of claim 32, wherein the base portion includes a retention structure configured to cooperate with a retention structure of the box portion to selectively secure the receiving structure to the box portion.

34. The telecommunications box of claim 32, wherein the base portion is configured to be removably coupled with a back wall of the box portion, and the adapter holder portion is configured to extend perpendicular to the back wall.

* * * * *